United States Patent [19]

Cseri

[11] Patent Number: 5,562,139
[45] Date of Patent: Oct. 8, 1996

[54] STRETCHABLE COVER FOR A TWO-WHEELED CYCLE

[76] Inventor: Thomas G. Cseri, 4060 Canyon Way, Pittsburg, Calif. 94565

[21] Appl. No.: 493,236

[22] Filed: Jun. 22, 1995

[51] Int. Cl.[6] ................................................. B62J 19/00
[52] U.S. Cl. ...................... 150/167; 206/335; 296/78.1; 296/136
[58] Field of Search ................................. 150/166, 167; 206/335; 296/78.1, 136

[56] References Cited

U.S. PATENT DOCUMENTS

| | | | |
|---|---|---|---|
| 1,853,742 | 4/1932 | Owens et al. | 150/167 X |
| 3,537,746 | 11/1970 | Peters | 296/78.1 |
| 3,659,872 | 5/1972 | Warner | 296/78.1 |
| 4,283,084 | 8/1981 | Gallagher | 296/78.1 |
| 4,944,340 | 7/1990 | Tortorich | 150/167 |
| 4,976,389 | 12/1990 | McLellan et al. | 224/328 |
| 5,062,560 | 11/1991 | Wasden | 224/328 |
| 5,282,502 | 2/1994 | Ballard | 150/167 |

FOREIGN PATENT DOCUMENTS

| | | | |
|---|---|---|---|
| 2476583 | 8/1981 | France | 206/335 |
| 2088798 | 6/1982 | United Kingdom | 296/136 |

*Primary Examiner*—Sue A. Weaver
*Attorney, Agent, or Firm*—Thomas R. Lampe

[57] ABSTRACT

A stretchable cover for providing a tight aerodynamic fit on a cycle to protect against the elements and windy conditions while the cycle is at rest or being transported. The cover is stretched over the front structure, the cycle frame and seat structure, attached to the front structure and seat structure and secured to the cycle's foot pegs to retain the cover on the cycle. Spaced openings in the cover receive opposed side mirrors of the cycle.

7 Claims, 2 Drawing Sheets

STRETCHABLE COVER FOR A TWO-WHEELED CYCLE

TECHNICAL FIELD

This invention relates to a stretchable protective cover for a two-wheeled cycle, such as a motorcycle, when it is at rest or being transported. The cover is for the purpose of protecting a cycle from the elements and also acts as a deterrent against theft of a cycle. The cover when applied to a cycle presents a tight fit and aerodynamic shape.

BACKGROUND ART

It is known to provide covers for motorcycles and other types of cycles for the purpose of affording a degree of protection from the elements.

Conventional prior art covers are customarily made of material such as vinyl or canvas which is of essentially non-stretchable character. Such covers are normally relatively large and cumbersome, making them for all practical purposes non-portable by a biker. Furthermore, prior art covers for motorcycles and the like are relatively unattractive and are not streamlined or form fitting.

Such covers are usually draped over the cycle and are relatively loosely fit in place, customarily being secured by ties or the like. In any event, such devices, being loosely fit if they can be considered to be fit at all to the bike do not afford adequate protection from dust and dirt, considerable space usually existing between the cover and components of the cycle. This situation is aggravated by virtue of the fact that cycles come in various sizes and configurations and prior art covers usually do not.

Another problem with prior art covers is that their removal by a thief would not trigger an alarm. Their baggy and loose fit make them easy to remove without the alarm sensing any vibration or movement. Also, the conventional prior art cycle cover can cause problems when trailering the covered cycle since its loose fitting character encourages flapping of the cover by the wind and even inadvertent removal of the cover.

Applicant is aware of the following United States patents which disclose covers of various types for bicycles: U.S. Pat. No. 4,944,340, issued Jul. 31, 1990, U.S. Pat. No. 4,976,389, issued Dec. 11, 1990, U.S. Pat. No. 5,282,502, issued Feb. 1, 1994, and U.S. Pat. No. 5,062,560, issued Nov. 5, 1991.

None of the covers disclosed in the aforesaid patents provide a teaching of the stretchable protective cover for cycles as described below and as set forth in the claims hereof.

DISCLOSURE OF INVENTION

The cover of the present invention uses a stretchable material to cover and protect a cycle. Because the cover can stretch to accommodate most sizes, much less material is needed to form the cover and an exacting fit can be made.

The cover is lightweight, compact and fully portable. The cover's tight, form fit and low profile aerodynamic design sheds wind and rain and keeps the cover on to protect against dust, debris and the sun's damaging rays. The cover's aerodynamic design and tight fit make it ideal for use when transporting a cycle; it will not flap in the wind and will not blow off the cycle.

The tight fit also aids in theft prevention. Removal will cause vibration and may trigger an alarm.

The stretchable cover includes a primary panel formed of stretchable sheet material and having a front end and a back end.

A front panel is attached to the front end of the primary panel for tight engagement with the front structure of a cycle.

A rear panel is attached to the rear end of the primary panel for tight engagement with the seat structure of a cycle.

Foot peg engagement elements are attached to opposed sides of the primary panel between the front and back ends thereof for engagement with foot pegs of a cycle to exert a downward pulling force on the primary panel.

The stretchable cover defines a pair of spaced openings for receiving opposed side mirrors of a cycle. The cover is stretched over the front structure and the seat structure and secured to the foot pegs when covering the cycle to retain the cover on a cycle. Other features, advantages, and objects of the present invention will become apparent with reference to the following description and accompanying drawings.

BEST MODE FOR CARRYING OUT THE INVENTION

Figure 1:
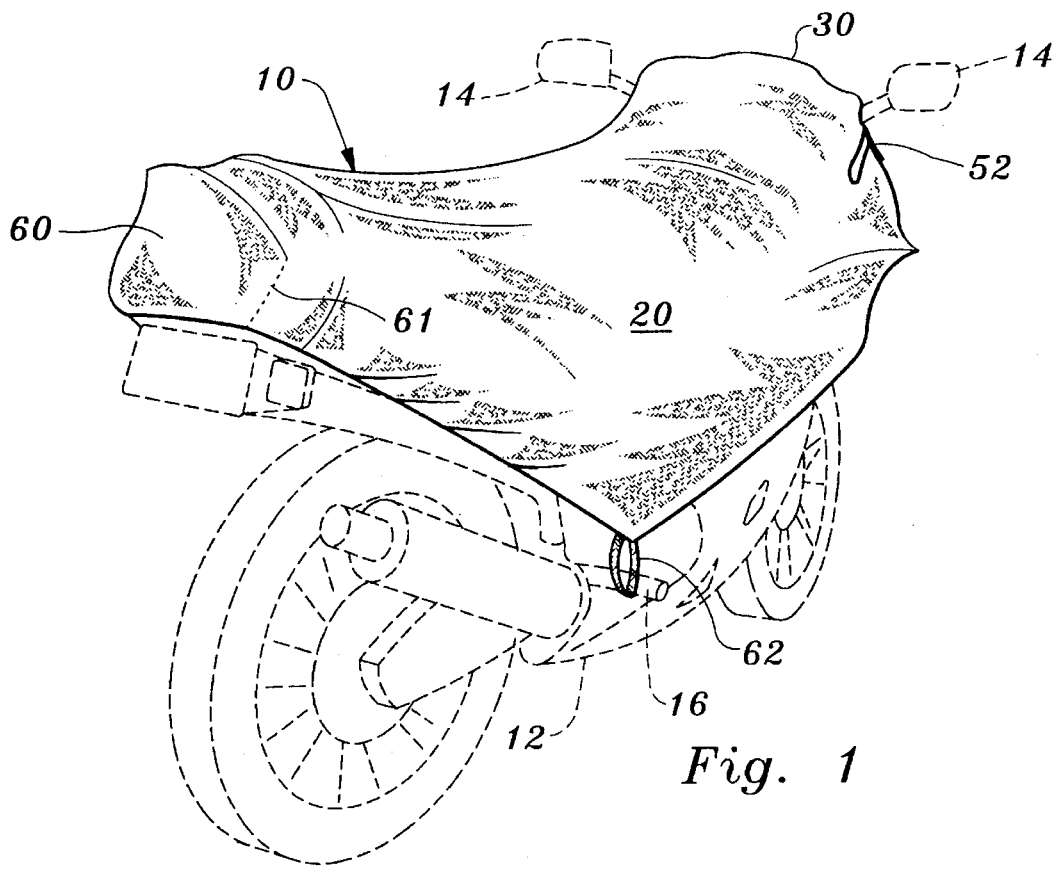
FIG. 1 is a rear perspective view illustrating the cover of the present invention in position on a motorcycle, the motorcycle being illustrated by dash lines.

The stretchable cover of the present invention is designated by reference numeral 10 and the purpose of the cover 10 is to cover and protect a cycle, such as motorcycle 12 illustrated in FIG. 1 by dash lines. Motorcycle 12 includes a cycle frame, front structure which may include a front fairing (covered by cover 10 in FIGS. 1 through 3), opposed side mirrors 14 and seat structure (also covered by cover 10 in FIGS. 1 through 3) which may include a rear seat fairing, all such components being standard structural features of a motorcycle, as are foot pegs 16.

Stretchable cover 10 is formed of a suitable stretchable fabric material. One suitable fabric has been found to be nylon spandex fabric, for example Spandura fabric sold by H. Warshow & Sons, Inc.

Figure 4:
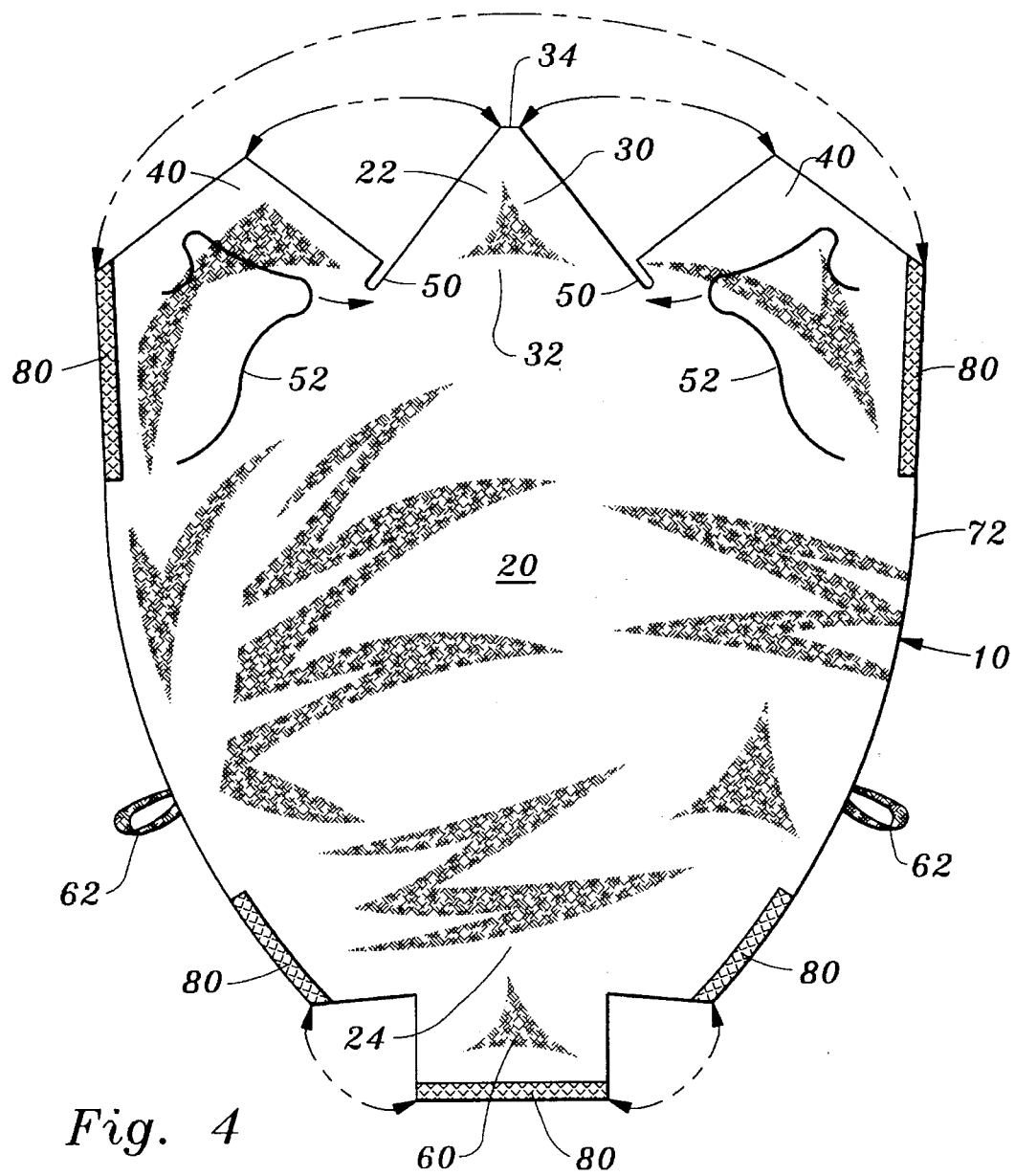
FIG. 4 is a top plan view of a cover blank utilized to form the cover and showing schematically by arrows how the blank is secured together to form the completed cover.

Cover 10 includes a primary panel 20 having a configuration shown in FIG. 4. Primary panel 20 has a front end 22 and a back end 24 (see FIG. 4). The primary panel is for positioning over the cycle frame of the motorcycle 12.

Figure 2:
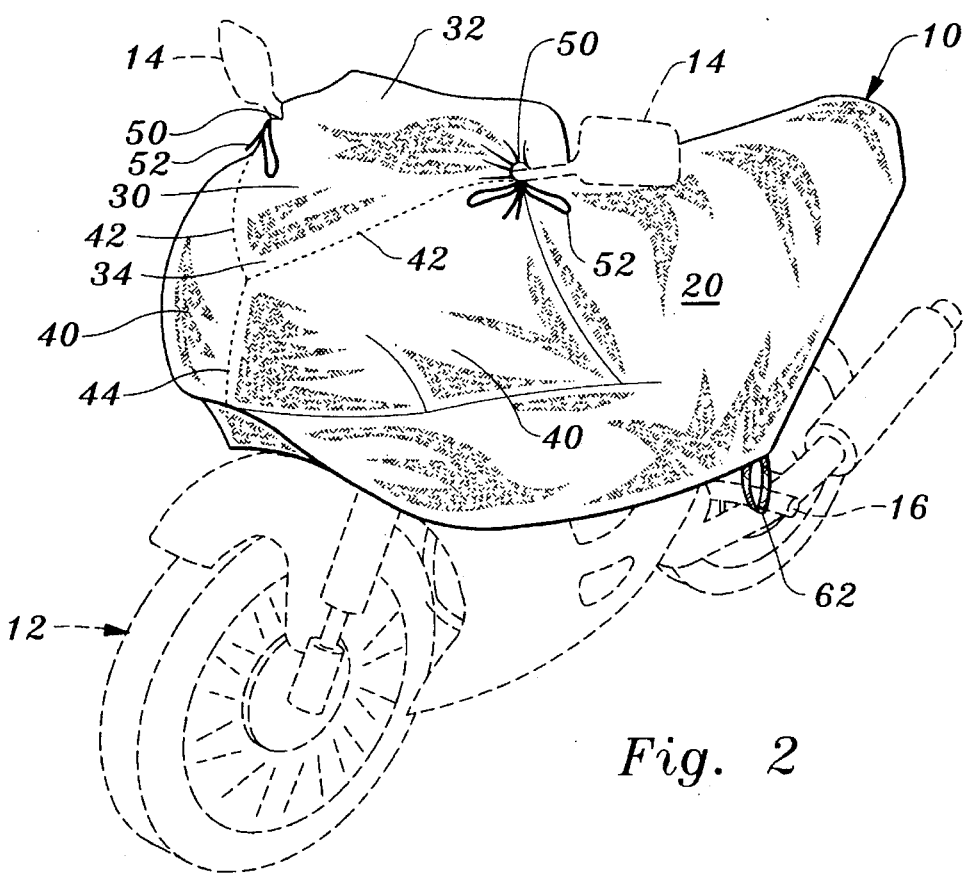
FIG. 2 is a front perspective view of the cover on the cycle.
Figure 3:
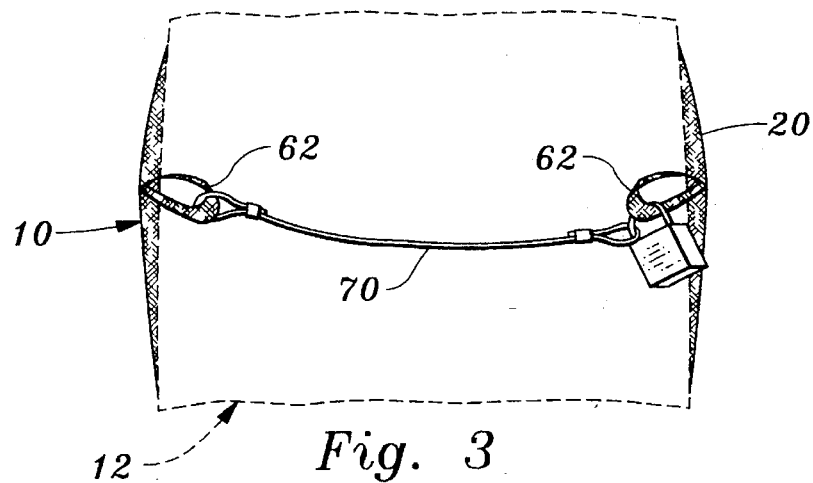
FIG. 3 is a bottom view illustrating foot pegs of the cover secured together by an elongated locking element which extends under the cycle.

A central front panel 30 of substantially triangular configuration is integral with the primary panel 20. Central front panel 30 is formed of the same stretchable sheet material as the primary panel and includes a base 32 at the front end of the primary panel and a distal end 34 spaced from the primary panel. The central front panel is for positioning over the front structure of motorcycle 12 as shown in FIG. 2.

A pair of side front panels 40 formed of the same stretchable sheet material and integral with primary panel 20 project from the primary panel at opposed sides of the central front panel 30. Side front panels 40 are stitched to the central front panel 30 by lines of stitching 42.

The side front panels, which are of equal, substantially triangular configuration, extend forwardly of the central front panel, and are adjoining and secured together downwardly of the central front panel by a line of stitching 44. The side front panels engage the front structure of the motorcycle 12 to retain the cover on the motorcycle, it being understood that the side front panels stretch over, alongside and then under the front structure as shown in FIG. 2.

The stretchable cover 10 defines a pair of spaced openings 50 which are in substantial alignment with the base 32 of panel 30 on opposed sides of the base. The openings receive the opposed side mirrors 14 of the motorcycle. Cinch cords 52 are utilized to tightly secure the cover at the openings about the support shafts holding the mirrors 14. Other suitable types of fasteners may be used. The central front panel 30 is in stretched condition between the mirrors.

A rear panel 60 formed of stretchable sheet material is integral with and extends from the back end of the primary panel 20. The sides of the rear panel 60 are sewn to the primary panel 20 along the side edges of the rear panel along lines of stitching 61 (only one of which is observable in FIG. 1) to define a pocket with the primary panel which stretches about and receives the seat structure of motorcycle 12 (which may include a rear seat fairing) as shown in FIGS. 1 and 2. This arrangement also serves to retain the cover on the motorcycle.

Attached to opposed sides of the primary panel 20 between the front and back ends thereof are foot peg receiving loops 62. The primary panel 20 is stretched and the loops 62, which may be nylon strapping, for example, receive the foot pegs to maintain the primary panel 20 in taut condition. Preferably, the loops 62 are attached to the primary panel at locations thereon which will result in the loops exerting downward and forward pulling forces on the primary panel when the stretchable cover is on motorcycle 12 and the loops receive the foot pegs thereof.

It will readily be understood from the above that the cover is maintained in stretched condition (which may be in the order of 50 per cent stretch or so) to essentially form-fit the cover to the cycle. This presents a stylish and aerodynamic appearance. The tight fitting cover 10 not only protects the cycle from the elements and very windy conditions but can also function as a deterrent from theft. For example, it is well known to incorporate motion sensitive alarms in motorcycles. A conventional loose cover can be readily removed from a cycle without actuating such an alarm. However, removal of the cover 10 with its tight form fit is likely to cause jarring or movement of the motorcycle of sufficient magnitude to actuate the alarm.

Theft can be further deterred by securing the loops or straps 62 together by an elongated locking element such as a lock cable 70, the lock cable 70 passing under the motorcycle frame. See FIG. 3 in this regard.

If desired, the peripherally extending edge 72 of the cover may have elastic reinforcement material 80 attached thereto either completely about the periphery or at strategic sections thereof (the latter being shown).

When the cover is in place, it will be stretched between the front structure, the seat structure and the foot pegs with the opposed side mirrors projecting through the spaced openings 50 thereof. This will afford significant protection for the cycle as well as accomplish the other objectives set forth above.

I claim:

1. A portable stretchable cover for covering a two wheeled cycle to protect the cycle from the elements and for deterring against theft of the cycle, the cycle including a frame, front structure, opposed side mirror, foot pegs, and seat structure, said stretchable cover comprising in combination:

a primary panel formed of stretchable sheet material and having a front end and a back end, said primary panel for positioning over the cycle frame of a cycle;

a central front panel of substantially triangular configuration formed of stretchable sheet material including a base attached to the front end of said primary panel and a distal end spaced from said primary panel, said central front panel for positioning over the front structure of a cycle;

a pair of side front panels formed of stretchable sheet material projecting from said primary panel at opposed sides of said central front panel, secured to said central front panel between said base and said distal end along the entire length of the opposed sides of the central front panel, and adjoining and secured together beyond and downwardly from said distal end for receiving and engaging the front structure of a cycle, said stretchable cover defining a pair of spaced openings in substantial alignment with said base on opposed sides of said base for receiving opposed side mirrors of a cycle to stretch said central front panel between the mirrors, and said mirrors and said secured side front panels cooperable to stretch the central front panel between said side mirrors and said front structure;

foot peg engagement elements attached to opposed sides of said primary panel between the front end and back end thereof for engagement with the foot pegs of a cycle; and a rear panel formed of stretchable sheet material attached to and extending from the back end of said primary panel for positioning in engagement with the seat structure of a cycle, said rear panel and said primary panel defining a pocket for receiving the seat structure of a cycle, said stretchable cover when mounted on a cycle covering said cycle and stretched between the front structure, seat structure and foot pegs of the cycle to retain said stretchable cover on the cycle.

2. The stretchable cover according to claim 1 wherein said foot peg engagement elements define loops for receiving foot pegs of a cycle, said loops being attached to said primary panel at locations thereon which will result in said loops exerting downward pulling forces on said primary panel when said stretchable cover is on a cycle and said loops receive the foot pegs thereof.

3. The stretchable cover according to claim 1 having a peripherally extending edge and including elastic reinforcement material at a plurality of segments of said peripherally extending edge.

4. The stretchable cover according to claim 1 additionally comprising means for fastening said stretchable cover about opposed side mirrors received by said spaced openings.

5. The stretchable cover according to claim 1 wherein said side front panels are of equal substantially triangular configuration and sewn together and to said central front panel.

6. The stretchable cover according to claim 1 in combination with an elongated locking element for securing together said foot peg engagement elements, said elongated locking element for passage under the cycle frame of a cycle covered by said stretchable cover.

7. The stretchable cover according to claim 1 wherein the stretchable sheet material of all of said panels comprises nylon/spandex material.

\* \* \* \* \*